UNITED STATES PATENT OFFICE.

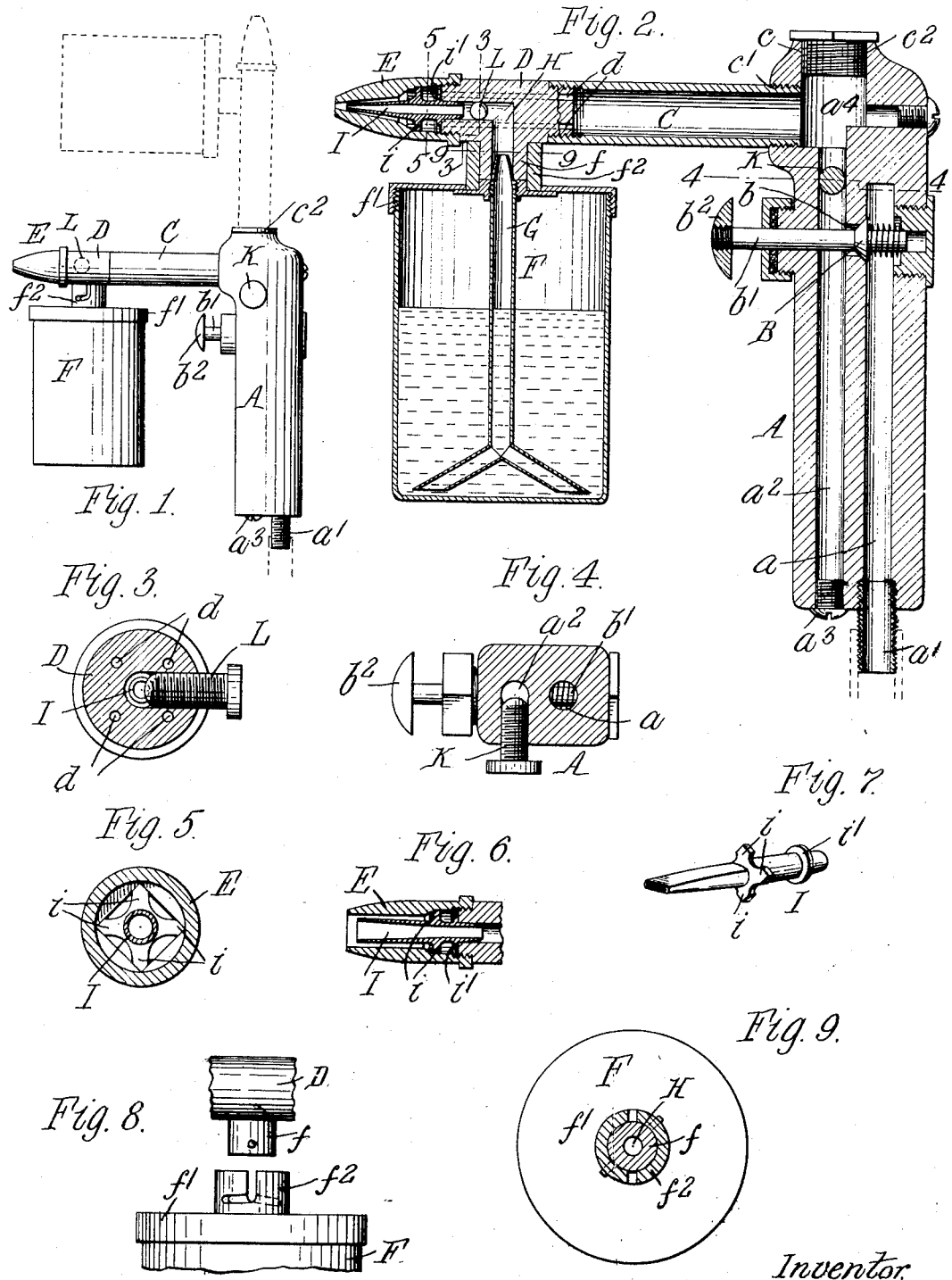

FREDERICK J. LEDERER, OF BUFFALO, NEW YORK.

AIR-BRUSH.

No. 918,754.　　　　Specification of Letters Patent.　　　Patented April 20, 1909.

Application filed November 12, 1908. Serial No. 462,236.

*To all whom it may concern:*

Be it known that I, FREDERICK J. LEDERER, a citizen of the United States, residing at Buffalo, in the county of Erie and State of New York, have invented a new and useful Improvement in Air-Brushes, of which the following is a specification.

One object of this invention is to provide an air brush which is of simple and compact construction and in which all of the parts are detachably connected together in such a manner that they can be readily disconnected from one another and cleaned without trouble.

Other objects of the invention are to arrange and connect the discharge nozzles for the liquid and the air to the brush in such a manner that both nozzles can be readily attached to and detached from the brush at the same time, and the discharge ends of the nozzles will at all times register with each other, thus permitting the employment of nozzles having any desired shape at their discharge ends; to provide an air expansion chamber between the air supply valve and the air discharge nozzle so that the current of air passing from the discharge nozzle will not be subject to violent fluctuations when the air valve is operated to regulate the supply of air, and to so construct the handle of the brush that the discharge nozzle may be secured thereto to extend at right angles to or in line with the handle in accordance with the nature of the work to be done.

In the accompanying drawings: Figure 1 is a side elevation of an air brush embodying the invention, showing by full and broken lines different positions of the nozzle. Fig. 2 is a longitudinal sectional elevation of the same on an enlarged scale. Fig. 3 is a cross-section, on an enlarged scale, of the liquid and air connection, on line 3—3, Fig. 2. Fig. 4 is a cross-section of the handle of the brush on line 4—4, Fig. 2. Fig. 5 is a cross-section of the discharge nozzles on line 5—5, Fig. 2. Fig. 6 is a fragmentary horizontal section through the discharge nozzles. Fig. 7 is a perspective view of the liquid discharge nozzle. Fig. 8 is a fragmentary elevation of the liquid and air connection and the liquid receptacle of the brush, showing the parts detached. Fig. 9 is a horizontal section of the coupling between the liquid receptacle and the liquid and air connection, on line 9—9, Fig. 2.

Like letters of reference refer to like parts in the several figures.

A represents the handle of an air brush. This handle is preferably solid and is provided with a longitudinal air inlet passage $a$ which extends from the bottom of the handle, being closed at its upper end and having at its lower end a nipple $a'$ for connection with a suitable air supply pipe. A second passage $a^2$ extends through the handle A substantially parallel with the passage $a$ and is closed at its lower end by a screw plug $a^3$ and is enlarged at its upper end, forming a chamber $a^4$ in the head of the handle. The passages $a$ and $a^2$ are connected by a port $b$ which is controlled by a spring-pressed valve B having a stem $b'$ which preferably passes through a hole in the front side of the handle A and is provided at its outer end with a head or knob $b^2$ for operating the valve. The position of the knob on the front side of the handle is such that it can be readily operated by the fore finger of the hand of the operator which grasps the handle in using the brush.

The head of the handle A is provided with end and side openings $c$ and $c'$ which communicate with the chamber $a^4$ and are adapted to receive the end of a tube C. In the construction shown, the tube C is screwed in the opening $c'$, extending at right angles to the handle A, and a screw plug $c^2$ closes the opening $c$, but when desired the tube may be secured in the opening $c$ to extend in line with the handle, as shown in dotted lines in Fig. 1, and the plug $c^2$ used to close the other opening $c'$. The tube C is closed at its forward end to form an air expansion chamber by a connection D which is provided with a plurality of small air passages $d$ which extend through the connection and communicate at their forward ends with the interior of an air nozzle E which is screwed or otherwise secured to the front end of the connection D, and thus serve to convey the air from the expansion chamber in the tube C to the air nozzle.

F represents a receptacle for the paint or other liquid used. This receptacle is preferably detachably secured to the connection D by any suitable means. In the construction shown, the connection D is provided with a depending portion or nipple $f$ and the receptacle F has a top or cover $f'$ provided with an upwardly-projecting neck $f^2$ which is adapted to embrace the nipple $f$ and has a bayonet connection therewith.

A forked feed pipe G is secured to the cover $f'$ and extends down into the liquid receptacle F. This pipe has a conical upper end which fits snugly into a liquid discharge passage H which extends through the nipple *f* and the body of the connection D and communicates at its front end with a liquid discharge nozzle I which is located within the air nozzle E with its inner end extending into the passage H.

The discharge ends of the air and liquid nozzles are similarly formed and are arranged one within the other with the discharge end of the air nozzle extending slightly beyond that of the liquid nozzle. In the construction shown, these nozzles are flat, but nozzles of other forms may be used according to the nature of the work. When flat nozzles, such as shown, are employed, the small space between the nozzles does not permit the outer nozzle to be turned independently of the inner nozzle to attach and detach the nozzles. To permit the nozzles to be readily attached to and detached from the air brush, the following construction is employed: The liquid nozzle I is provided with arms *i* which project outwardly therefrom and are adapted to fit between internal faces or parts in the air nozzle to hold the nozzles concentric and cause the nozzles to turn together when being attached to and detached from the brush. The nozzles can thus be put together in proper position before being attached to the air brush, and when so fitted are prevented from turning relative to each other. The air nozzle E can then be screwed in place upon the connection D, and the inner end of the liquid nozzle will be caused to enter the liquid passage H, and as the inner end of the liquid nozzle I is tapered, a tight joint between this nozzle and the passage H is secured. The nozzle I also has a collar *i'* near its inner end to assist in making a tight joint. When the nozzles are in place the spaces between the arms *i'* of the liquid nozzle preferably register with the air passages *d* in the connection D and permit the air to pass freely to the discharge end of the nozzle.

K and L represent screw valves for controlling the air passage $a^2$ in the handle A and the liquid passage H in the connection D. By adjusting these valves the flow of air and liquid through these passages may be regulated as desired.

I claim as my invention:

1. In an air brush, the combination with air and liquid discharge nozzles, of a receptacle for the liquid connected with said liquid discharge nozzle, a handle having an air supply passage, a valve in said passage for controlling the flow of air to said air nozzle, and a tube of greater internal diameter than said air supply passage which connects said passage with said air discharge nozzle and forms an air expansion chamber between said valve and said nozzle, substantially as set forth.

2. In an air brush, the combination with air and liquid discharge nozzles, of a receptacle for the liquid connected with said liquid discharge nozzle, a handle having an air supply passage, a valve in said passage for controlling the flow of air to said air nozzle, and a tube which connects said handle with said air and liquid nozzles and forms a support for said nozzles, said tube communicating at its opposite ends with said air supply passage and said air discharge nozzle and being of greater internal diameter than said air supply passage to form an air expansion chamber between said valve and said nozzle, substantially as set forth.

3. In an air brush, the combination with air and liquid discharge nozzles, of a receptacle for the liquid connected with said liquid discharge nozzle, a handle for said brush having an air supply passage and a plurality of openings communicating therewith and arranged at an angle to each other, and connections between said handle and said air discharge nozzle which are adapted to be secured in either of said openings whereby said nozzle may extend at an angle to or lengthwise of said handle, substantially as set forth.

4. In an air brush, the combination of air and liquid nozzles one arranged within the other with their discharge orifices in register and having engaging parts which hold said nozzles from turning relative to each other, a connection to which said outer nozzle is detachably secured, said inner nozzle being held on said connection by said outer nozzle, and sources of air and liquid supply connected with said nozzles, substantially as set forth.

5. In an air brush, the combination of an air nozzle, a liquid nozzle arranged therein with its discharge orifice in register with the discharge orifice of said air nozzle and having parts which interlock with parts on said air nozzle and hold said nozzles from turning relative to each other, a connection to which the air nozzle is detachably secured, said liquid nozzle being held on said connection by said air nozzle, and sources of air and liquid supply connected with said air and liquid nozzles, substantially as set forth.

Witness my hand, this 10th day of November, 1908.

FREDERICK J. LEDERER.

Witnesses:
C. B. HORNBECK.
E. C. HARD.